United States Patent
Kanagawa et al.

(10) Patent No.: US 9,670,391 B2
(45) Date of Patent: Jun. 6, 2017

(54) MOISTURE-CURABLE POLYURETHANE HOT-MELT RESIN COMPOSITION, ADHESIVE, AND ARTICLE

(71) Applicant: DIC Corporation, Tokyo (JP)

(72) Inventors: Yoshinori Kanagawa, Osaka (JP); Toyokuni Fujiwara, Osaka (JP); Ryou Nonaka, Osaka (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/352,017

(22) PCT Filed: Oct. 11, 2012

(86) PCT No.: PCT/JP2012/076312
§ 371 (c)(1),
(2) Date: Apr. 15, 2014

(87) PCT Pub. No.: WO2013/061790
PCT Pub. Date: May 2, 2013

(65) Prior Publication Data
US 2014/0242396 A1    Aug. 28, 2014

(30) Foreign Application Priority Data
Oct. 24, 2011 (JP) ................. 2011-232889

(51) Int. Cl.
| | | |
|---|---|---|
| C09J 175/06 | (2006.01) | |
| C09J 175/04 | (2006.01) | |
| C08G 18/76 | (2006.01) | |
| C08G 18/40 | (2006.01) | |
| C08G 18/42 | (2006.01) | |
| C08G 18/48 | (2006.01) | |
| C08G 18/62 | (2006.01) | |

(52) U.S. Cl.
CPC ........ *C09J 175/06* (2013.01); *C08G 18/4018* (2013.01); *C08G 18/4063* (2013.01); *C08G 18/4202* (2013.01); *C08G 18/4238* (2013.01); *C08G 18/4255* (2013.01); *C08G 18/4808* (2013.01); *C08G 18/4825* (2013.01); *C08G 18/6229* (2013.01); *C08G 18/7671* (2013.01); *C09J 175/04* (2013.01); *C08G 2170/20* (2013.01); *Y10T 428/31551* (2015.04)

(58) Field of Classification Search
CPC .. C08G 18/12; C08G 18/307; C08G 18/4018; C08G 18/4063; C08G 18/4202; C08G 18/4238; C08G 18/4255; C08G 18/4808; C08G 18/4825; C08G 18/6229; C08G 18/7671; C08G 2170/20; C09J 175/04; C09J 175/06; Y10T 428/31551

USPC ................. 428/423.1; 525/440.07
See application file for complete search history.

(56) References Cited

U.S. PATENT DOCUMENTS

| | | | |
|---|---|---|---|
| 5,472,785 A | 12/1995 | Stobbie, IV et al. | |
| 6,191,212 B1 * | 2/2001 | Kube | 524/590 |
| 6,387,449 B1 | 5/2002 | Reid et al. | |
| 9,464,155 B2 * | 10/2016 | Kanagawa | C08G 18/12 |
| 2007/0232764 A1 * | 10/2007 | Minamida | C08G 18/12 525/453 |
| 2008/0292902 A1 * | 11/2008 | Reid | 428/626 |
| 2009/0022984 A1 * | 1/2009 | Ehrmann et al. | 428/423.1 |
| 2009/0214875 A1 * | 8/2009 | Paschkowski | 428/423.1 |
| 2010/0104831 A1 | 4/2010 | Kanagawa et al. | |
| 2010/0152394 A1 * | 6/2010 | Slark et al. | 525/452 |
| 2011/0287242 A1 | 11/2011 | Kanagawa et al. | |

FOREIGN PATENT DOCUMENTS

| | | |
|---|---|---|
| JP | 10-500708 A | 1/1998 |
| JP | 2000-344852 A | 12/2000 |
| JP | 2003-027030 A | 1/2003 |
| JP | 2003-515637 A | 5/2003 |
| JP | 2005-179422 A | 7/2005 |
| JP | 2005-314445 A | 11/2005 |
| JP | 2008-248152 A | 10/2008 |
| JP | 4240158 B1 | 3/2009 |
| JP | 2010-528160 A | 8/2010 |
| JP | 2012184341 A * | 9/2012 |
| WO | 2009/107301 A1 | 9/2009 |

OTHER PUBLICATIONS

International Search Report, mailed Jan. 29, 2013, which issued during the prosecution of International Application No. PCT/JP2012/076312, which corresponds to the present application.

* cited by examiner

*Primary Examiner* — Thao T Tran
(74) *Attorney, Agent, or Firm* — McDermott Will & Emery LLP

(57) ABSTRACT

It is an object of the present invention to provide a moisture-curable polyurethane hot-melt resin composition having excellent waterproof properties, drop impact resistance, and flexibility. The present invention provides a moisture-curable polyurethane hot-melt resin composition containing a urethane prepolymer having an isocyanate group, the urethane prepolymer being produced through a reaction of a polyol (A) with a polyisocyanate (B), wherein the polyol (A) contains a polyether polyol (A-1), a crystalline polyester polyol (A-2), an amorphous polyester polyol (A-3), and an acrylic polyol (A-4). The present invention also provides an adhesive containing such a composition and an article in which such a composition is used.

8 Claims, No Drawings

MOISTURE-CURABLE POLYURETHANE HOT-MELT RESIN COMPOSITION, ADHESIVE, AND ARTICLE

CROSS REFERENCE TO PRIOR APPLICATIONS

This application is a U.S. National Phase application under 35 U.S.C. §371 of International Application No. PCT/JP2012/076312, filed on Oct. 11, 2012 and claims benefit of priority to Japanese Patent Application No. 2011-232889, filed on Oct. 24, 2011. The International Application was published in Japanese on May 2, 2013 as WO 2013/061790 A1 under PCT Article 21(2). The contents of the above applications are hereby incorporated by reference.

TECHNICAL FIELD

The present invention relates to a moisture-curable polyurethane hot-melt resin composition having excellent waterproof properties, drop impact resistance, and flexibility; the present invention also relates to an adhesive and article in which such a composition is used.

BACKGROUND ART

Since moisture-curable polyurethane hot-melt adhesives are free from solvents, various studies for use thereof as environmental-responsive adhesives have been conducted especially in the fields of fiber bonding and lamination of building materials. Such adhesives have been widely used also in industrial fields.

In recent years, in view of growth in demands for reducing the weight and thickness of optical components, using hot-melt adhesives instead of acrylic adhesives which have been mainly used has been studied in bonding of optical components.

An adhesive containing a hot-melt adhesive composition which is resistant to moisture and heat and composed of the following components, for example, has been disclosed as the above-mentioned adhesive (for instance, see Patent Literature 1): (a) 100 parts by weight of a polyurethane resin having a flow-beginning temperature ranging from 55° C. to 110° C., (b) 5 to 150 parts by weight of an unsaturated polyester resin having a Tg ranging from 0° C. to 110° C. and a molecular weight of 10000 to 25000, (c) 10 to 150 parts by weight of an epoxy resin having a softening point of 60° C. to 140° C. and a molecular weight of 700 to 3000, and (d) 10 to 200 parts by weight of an inorganic filler subjected to a surface treatment with a coupling agent, relative to the polyurethane resin (a).

Such an adhesive has a resistance to moisture and heat, and this resistance is at a practically acceptable level. In the case where an article in which the adhesive has been used for lamination is immersed into water, however, the water intrudes into the article in a relatively short time in some cases; unfortunately, the waterproof performance thereof was insufficient.

The hot-melt adhesive composition that is resistant to moisture and heat has an advantage of enabling adhesion even at low temperature; however, use of the epoxy resin causes problems such as insufficient flexibility of the adhesive itself and peeling of the adhesive layer from an article when the article is dropped.

CITATION LIST

Patent Literature

PTL 1: Japanese Unexamined Patent Application Publication No. 2003-27030

SUMMARY OF INVENTION

Technical Problem

It is an object of the present invention to provide a moisture-curable polyurethane hot-melt resin composition having excellent waterproof properties, drop impact resistance, and flexibility.

Solution to Problem

In the studies for achieving the above-mentioned object, the inventors have focused on a polyol used for a urethane prepolymer and intensively studied it, thereby accomplishing the present invention.

In particular, an aspect of the present invention provides a moisture-curable polyurethane hot-melt resin composition containing a urethane prepolymer having an isocyanate group, the urethane prepolymer being produced through a reaction of a polyol (A) with a polyisocyanate (B), wherein the polyol (A) contains a polyether polyol (A-1), a crystalline polyester polyol (A-2), an amorphous polyester polyol (A-3), and an acrylic polyol (A-4). Other aspects of the present invention provide an adhesive containing such a composition and an article in which such a composition is used.

Advantageous Effects of Invention

The adhesive containing the moisture-curable polyurethane hot-melt resin composition according to an aspect of the present invention has advantages in terms of waterproof properties, drop impact resistance, flexibility, adhesion to a variety of substrates, coating workability, shape retention after application, and open time.

Hence, the adhesive containing the moisture-curable polyurethane hot-melt resin composition according to an aspect of the present invention can be suitably used for lamination of optical components as well as for fiber bonding and lamination of building materials.

DESCRIPTION OF EMBODIMENTS

The moisture-curable polyurethane hot-melt resin composition of the present invention contains a urethane prepolymer having an isocyanate group; the urethane prepolymer having an isocyanate group is produced through a reaction of a polyol (A) with a polyisocyanate (B), the polyol (A) containing a polyether polyol (A-1), a crystalline polyester polyol (A-2), an amorphous polyester polyol (A-3), and an acrylic polyol (A-4).

The polyether polyol (A-1) is an essential component for adjusting the melt viscosity and open time (time for which lamination can be carried out) of the composition to be appropriate after application of the composition to produce good workability, adhesive properties, waterproof properties, and flexibility. Examples of the polyether polyol (A-1) which can be used include polyethylene glycol, polypropylene glycol, polybutylene glycol, polytetramethylene glycol, and ethylene oxide-modified polypropylene glycol.

The number average molecular weight of the polyether polyol (A-1) is preferably in the range of 500 to 5,000, and more preferably 700 to 5,000 in terms of adhesive properties (initial bond strength and final bond strength) and appropriate open time after application of the composition. The number average molecular weight of the polyether polyol is measured by gel permeation chromatography (GPC) under the following conditions.

Measurement Apparatus: High-performance GPC apparatus ("HLC-8220GPC" manufactured by TOSOH CORPORATION) Column: the following columns manufactured by TOSOH CORPORATION are used and connected to each other in series
  "TSKgel G5000" (7.8 mm I.D.×30 cm): one
  "TSKgel G4000" (7.8 mm I.D.×30 cm): one
  "TSKgel G3000" (7.8 mm I.D.×30 cm): one
  "TSKgel G2000" (7.8 mm I.D.×30 cm): one
Detector: RI (refractive index) detector
Column temperature: 40° C.
Eluent: Tetrahydrofuran (THF)
Flow rate: 1.0 mL/min
Input: 100 μL (tetrahydrofuran solution having a sample concentration of 0.4 mass %)
Standard sample: The following standard polystyrenes are used to define calibration curves.
  (Standard Polystyrene)
  "TSKgel standard polystyrene A-500" manufactured by TOSOH CORPORATION
  "TSKgel standard polystyrene A-1000" manufactured by TOSOH CORPORATION
  "TSKgel standard polystyrene A-2500" manufactured by TOSOH CORPORATION
  "TSKgel standard polystyrene A-5000" manufactured by TOSOH CORPORATION
  "TSKgel standard polystyrene F-1" manufactured by TOSOH CORPORATION
  "TSKgel standard polystyrene F-2" manufactured by TOSOH CORPORATION
  "TSKgel standard polystyrene F-4" manufactured by TOSOH CORPORATION
  "TSKgel standard polystyrene F-10" manufactured by TOSOH CORPORATION
  "TSKgel standard polystyrene F-20" manufactured by TOSOH CORPORATION
  "TSKgel standard polystyrene F-40" manufactured by TOSOH CORPORATION
  "TSKgel standard polystyrene F-80" manufactured by TOSOH CORPORATION
  "TSKgel standard polystyrene F-128" manufactured by TOSOH CORPORATION
  "TSKgel standard polystyrene F-288" manufactured by TOSOH CORPORATION
  "TSKgel standard polystyrene F-550" manufactured by TOSOH CORPORATION The crystalline polyester polyol (A-2) is an essential component for developing waterproof properties, adhesive properties (initial bond strength), and open time, and examples thereof includes products produced through a reaction of compounds having a hydroxyl group with polybasic acids. The term "being crystalline" is herein defined as follows: in DSC (differential scanning calorimetry) based on JIS K 7121 at a temperature-increasing rate of 20° C./min, if the amount of the heat absorption of a material at the heat absorption peak corresponding to the melting point is not less than 20 J/g, the material is crystalline. The term "being amorphous" refers to the other materials.

Examples of compounds that can be used as the compounds having a hydroxyl group include ethylene glycol, propylene glycol, butanediol, pentanediol, hexanediol, heptanediol, octanediol, nonanediol, decanediol, trimethylolpropane, trimethylolethane, and glycerin. These compounds may be used alone or in combination. Among them, butanediol, hexanediol, octanediol, or decanediol is preferably used in terms of an enhancement in crystallinity and improvement of waterproof properties and adhesive properties.

The polybasic acids are preferably dibasic acids, and examples of usable dibasic acids include oxalic acid, malonic acid, succinic acid, adipic acid, sebacic acid, azelaic acid, and 1,12-dodecanedicarboxylic acid.

The number average molecular weight of the crystalline polyester polyol (A-2) is preferably in the range of 500 to 5,000, and more preferably 1,000 to 4,000 in terms of waterproof properties and adhesive properties. The number average molecular weight of the crystalline polyester polyol (A-2) can be measured as in the measurement of the number average molecular weight of the polyether polyol (A-1).

The glass transition temperature (Tg) of the crystalline polyester polyol (A-2) is preferably in the range of 40 to 130° C. The glass transition temperature of the crystalline polyester polyol (A-2) is measured by DSC in accordance with JIS K 7121-1987; in particular, the crystalline polyester polyol (A-2) is put into a differential scanning calorimeter, heated to a temperature (Tg+50° C.) at a temperature-increasing rate of 10° C./min, subsequently held for 3 minutes, and then quickly cooled, and the midpoint glass transition temperature (Tmg) determined from the obtained thermal differential curve is defined as the glass transition temperature.

In terms of flexibility, adhesive properties, and open time, the amount of the crystalline polyester polyol (A-2) is preferably in the range of 20 to 400 parts by mass, more preferably 25 to 300 parts by mass, and especially preferably 30 to 230 parts by mass relative to 100 parts by mass of the ether polyol (A-1).

Polycaprolactone polyol can be used as the crystalline polyester polyol (A-2). Examples of usable polycaprolactone polyol include products produced through a reaction of the above-mentioned compounds having a hydroxyl group with ε-caprolactone.

In the case where a polycaprolactone polyol is used as the crystalline polyester polyol (A-2), the number average molecular weight thereof is preferably in the range of 20,000 to 200,000.

The amorphous polyester polyol (A-3) is an essential component for adjusting the melt viscosity and open time (time for which lamination can be carried out) of the composition to be appropriate after application of the composition to produce good workability, adhesive properties, waterproof properties, and flexibility. Examples of the amorphous polyester polyol (A-3) to be used include products produced through a reaction of the following compounds having a hydroxyl group with polybasic acids.

Examples of the compounds having a hydroxyl group include ethylene glycol, propylene glycol, 1,4-butanediol, pentanediol, 2,4-diethyl-1,5-pentanediol, 3-methyl-1,5-pentanediol, hexanediol, neopentylglycol, hexamethylene glycol, glycerin, trimethylolpropane, bisphenol A, bisphenol F, and alkylene oxide adducts thereof. Among these, alkylene oxide adducts of bisphenol A are preferably used in terms of improvement of waterproof properties, adhesive properties, and flexibility. The number of moles of the alkylene oxide to be added is preferably from 2 to 10 moles, and more preferably 4 to 8 moles.

Examples of usable polybasic acids include adipic acid, glutaric acid, pimelic acid, suberic acid, dimer acid, sebacic acid, undecanedicarboxylic acid, hexahydroterephthalic acid, phthalic acid, phthalic anhydride, isophthalic acid, and terephthalic acid.

The number average molecular weight of the amorphous polyester polyol (A-3) is preferably in the range of 500 to 5,000, more preferably 1,000 to 4,000, and further preferably 1,000 to 3,000 in terms of improvement of waterproof properties, adhesive properties, and flexibility.

The glass transition temperature of the amorphous polyester polyol (A-3) is preferably in the range of −70 to −10° C. in terms of improvement of waterproof properties, adhesive properties, and flexibility. The glass transition temperature of the amorphous polyester polyol (A-3) is measured as in the measurement of the glass transition temperature (Tg) of the crystalline polyester polyol (A-2).

In terms of improvement of waterproof properties, adhesive properties, and flexibility, the amount of the amorphous polyester polyol (A-3) is preferably in the range of 10 to 300 parts by mass, more preferably 20 to 250 parts by mass, and further preferably 25 to 180 parts by mass relative to 100 parts by mass of the ether polyol (A-1).

The acrylic polyol (A-4) is an essential component for adjusting the open time (time for which lamination can be carried out) of the composition to be appropriate after application of the composition to produce good workability, waterproof properties, and adhesive properties. The acrylic polyol (A-4) is produced through polymerization of a (meth)acrylic compound; in the polymerization, a (meth)acrylic compound having a hydroxyl group is used as an essential component. The term "(meth)acrylic compound" herein refers to either or both of a methacrylic compound and an acrylic compound.

Examples of a usable (meth)acrylic compound having a hydroxyl group include 2-hydroxyethyl (meth)acrylate, hydroxypropyl (meth)acrylate, and hydroxybutyl (meth)acrylate.

Examples of other usable (meth)acrylic compounds include (meth)alkyl acrylates such as (meth)acrylate, methyl (meth)acrylate, ethyl (meth)acrylate, n-butyl (meth)acrylate, isobutyl (meth)acrylate, tert-butyl (meth)acrylate, neopentyl (meth)acrylate, 2-ethylhexyl (meth)acrylate, octyl (meth)acrylate, stearyl (meth)acrylate, isostearyl (meth)acrylate, cetyl (meth)acrylate, and lauryl (meth)acrylate; (meth)acrylic compounds having a fluorine atom, such as 2,2,2-trifluoroethyl (meth)acrylate, 2,2,3,3-tetrafluoropropyl (meth)acrylate, 1H,1H,5H-octafluoropentyl (meth)acrylate, and 2-(perfluorooctyl)ethyl (meth)acrylate; (meth)acrylic compounds having an alicyclic structure, such as isobornyl (meth)acrylate, cyclohexyl (meth)acrylate, dicyclopentanyl (meth)acrylate, and dicyclopentenyloxyethyl (meth)acrylate; (meth)acrylic compounds having an ether group, such as polyethylene glycol mono(meth)acrylate, methoxyethyl (meth)acrylate, methoxybutyl (meth)acrylate, methoxytriethylene glycol (meth)acrylate, and methoxypolyethylene glycol (meth)acrylate; and benzyl (meth)acrylate, 2-ethyl-2-methyl-[1,3]-dioxolane-4-yl-methyl (meth)acrylate, and dimethyl aminoethyl (meth)acrylate. These (meth)acrylic compounds may be used alone or in combination. In particular, a combination use of the (meth)acrylic compound having a hydroxyl group and (meth)alkyl acrylate is preferred in terms of improvement of waterproof properties, adhesive properties, and open time; 2-hydroxyethyl (meth)acrylate, methyl (meth)acrylate, and n-butyl (meth)acrylate are preferably used.

The number average molecular weight of the acrylic polyol (A-4) is preferably in the range of 5,000 to 50,000, and especially preferably 10,000 to 30,000 in terms of improvement of waterproof properties, adhesive properties, and open time. The number average molecular weight of the acrylic polyol (A-4) is measured as in the measurement of the number average molecular weight of the polyether polyol (A-1).

The glass transition temperature of the acrylic polyol (A-4) is preferably in the range of 30 to 120° C., and more preferably 50 to 80° C. in terms of improvement of waterproof properties, adhesive properties (in particular, enhancement in initial bond strength due to enhanced cohesion), and open time. The glass transition temperature of the acrylic polyol (A-4) is measured as in the measurement of the glass transition temperature (Tg) of the crystalline polyester polyol (A-2).

In terms of improvement of waterproof properties, adhesive properties, and open time, the amount of the acrylic polyol (A-4) is preferably in the range of 20 to 400 parts by mass, more preferably 40 to 280 parts by mass, and especially preferably 45 to 150 parts by mass relative to 100 parts by mass of the ether polyol (A-1).

The polyol (A) contains the components (A-1) to (A-4) but may additionally contain polycarbonate polyol, polybutadiene polyol, dimer diol, or another component provided that the effects of the present invention are not impaired.

The polyisocyanate (B) is preferably diisocyanate, and examples of usable diisocyanate include aromatic polyisocyanates such as polymethylene polyphenyl polyisocyanate, diphenylmethane diisocyanate, carbodiimide-modified diphenylmethane diisocyanate isocyanate, phenylene diisocyanate, tolylene diisocyanate, and naphthalene diisocyanate; and aliphatic or alicyclic polyisocyanates such as hexamethylene diisocyanate, lysine diisocyanate, cyclohexane diisocyanate, isophorone diisocyanate, dicyclohexylmethane diisocyanate, xylylene diisocyanate, and tetramethylxylylene diisocyanate. Among these, diphenylmethane diisocyanate is preferred in terms of reactivity and adhesive properties.

In terms of viscosity, the amount of the polyisocyanate (B) is preferably in the range of 10 to 50 parts by mass, and more preferably 10 to 30 parts by mass relative to 100 parts by mass of the moisture-curable polyurethane hot-melt resin composition of the present invention.

The urethane prepolymer (i) can be produced through a reaction of the polyol (A) with the polyisocyanate (B) and has an isocyanate group at its polymer end or in its molecule, the isocyanate group enabling a cross-linked structure to be formed by reacting with moisture present in air or in a case or target object to which the urethane prepolymer is to be applied.

In an example of a process for producing the urethane prepolymer (i), a mixture containing the polyol (A) is dropped into a reactor holding the polyisocyanate (B), the content is subsequently heated, and reaction is carried out under such conditions that enable the isocyanate group of the polyisocyanate (B) to be in excess of the hydroxyl group of the polyol (A), thereby producing the urethane prepolymer (i).

In the production of the urethane prepolymer (i), an equivalent ratio of the isocyanate group of the polyisocyanate (B) to the hydroxyl group of the polyol (A) ([isocyanate group/hydroxyl group]) is preferably in the range of 1.1 to 5.0, and more preferably 1.5 to 3.0 in terms of waterproof properties, adhesive properties, and flexibility.

The urethane prepolymer (i) can be normally produced without use of a solvent but may be produced by allowing the polyol (A) to react with the polyisocyanate (B) in an organic solvent. In the reaction in an organic solvent, an organic solvent that does not inhibit the reaction, such as ethyl acetate, n-butyl acetate, methyl ethyl ketone, or toluene, can be used; however, the organic solvent needs to be removed by, for instance, heating under reduced pressure in the middle of the reaction or after the reaction.

In the production of the urethane prepolymer (i), a urethanation catalyst can be optionally used. The urethanation catalyst can be appropriately used at any stage of the reaction.

Examples of usable urethanation catalyst include nitrogen-containing compounds such as triethylamine, triethylenediamine, and N-methylmorpholine; metal salts such as potassium acetate, zinc stearate, and tin octylate; and organic metal compounds such as dibutyltin dilaurate.

The isocyanate group content (hereinafter abbreviated as "NCO %") of the urethane prepolymer (i) produced in the manner described above is preferably in the range of 1.5 to 8.0%, more preferably 1.7 to 5.0, and especially preferably 1.8 to 3.0 in terms of further improvement of waterproof properties, adhesive properties, and flexibility. The NCO % of the urethane prepolymer (i) is measured by potentiometric titration in accordance with JIS K 1603-1.

The viscosity of the urethane prepolymer (i), in particular, the melt viscosity at 125° C. is preferably in the range of 1,000 to 50,000 mPa·s, and more preferably 2,000 to 10,000 mPa·s. The melt viscosity at 125° C. is measured with a cone-and-plate viscometer (manufactured by ICI).

The softening point of the urethane prepolymer (i) is preferably in the range of 30 to 120° C. in terms of waterproof properties, adhesive properties, and workability. The term "softening point" is defined as follows: in the case where the temperature of the urethane prepolymer is increased in stages, the temperature at which the urethane prepolymer starts to thermally flow and loose the cohesion is the softening point of the urethane prepolymer. The softening point of the urethane prepolymer (i) is determined by a ring-and-ball method in accordance with JIS K 5902.

The moisture-curable polyurethane hot-melt resin composition of the present invention will now be described.

The moisture-curable polyurethane hot-melt resin composition of the present invention may be composed of only the urethane prepolymer but may optionally contain other additives.

Examples of such additives that can be used include an antioxidant, a tackifier, a plasticizer, a stabilizer, a filler, a dye, a pigment, a fluorescent brightening agent, a silane coupling agent, a wax, and a thermoplastic resin.

The adhesive containing the moisture-curable polyurethane hot-melt resin composition of the present invention has advantages in terms of waterproof properties, drop impact resistance, flexibility, adhesion to a variety of substrates, coating workability, shape retention after application, and open time and can be suitably used for lamination of optical components as well as for fiber bonding and lamination of building materials.

Examples of the adhesive used for the lamination of optical components include sealants used in mobile phones, personal computers, gaming machines, television sets, car navigation systems, cameras, and speakers.

In an example of the lamination, the moisture-curable polyurethane hot-melt resin composition is heated at a temperature ranging from 50 to 130° C. to be melted and then applied onto one material, and then the other material is placed on the applied composition to produce an article.

Examples of such materials include materials formed of glass, acrylic resins, urethane resins, silicon resins, epoxy resins, fluororesins, polystyrene resins, polyester resins, polysulfone resins, polyacrylate resins, polyvinyl chloride resins, polyvinylidene chlorides, cycloolefin resins such as norbornene, polyolefin resins, polyimide resins, alicyclic polyimide resins, cellulose resins, polycarbonate (PC), polybutylene terephthalate (PBT), modified polyphenylene ether (modified PPE), polyethylene naphthalate (PEN), polyethylene terephthalate (PET), lactic acid polymers, acrylonitrile-butadiene-styrene (ABS) copolymers, and acrylonitrile-styrene (AS) copolymers. Such materials may be optionally subjected to, for instance, a corona treatment, a plasma treatment, or a primer treatment.

Examples of techniques usable for applying the moisture-curable polyurethane hot-melt resin composition include techniques involving use of a roll coater, spray coater, T-die coater, knife coater, and comma coater. The moisture-curable polyurethane hot-melt resin composition of the present invention has a low viscosity and exhibits shape retention after application; hence, the composition can be also applied, for example, by a technique involving use of a dispenser, ink-jet printing, screen printing, and offset printing. Such techniques of application can be preferably employed because they enable the moisture-curable polyurethane hot-melt resin composition to be applied to an intended part of the above-mentioned material and thus eliminate a loss generated by, for example, punching. In addition, these techniques of application enable the moisture-curable polyurethane hot-melt resin composition to be applied onto the above-mentioned materials in a variety of continuous or intermittent forms such as a point, a line, a triangle, a square, a circle, and a curve.

The thickness of an adhesive layer formed of the moisture-curable polyurethane hot-melt resin composition can be determined on the basis of applications in which the adhesive layer is used; for example, the thickness can be appropriately determined within the rage of 10 μm to 5 mm.

Conditions for aging after the lamination can be appropriately determined; for instance, the temperature is from 20 to 80° C., relative humidity is from 50 to 90% RH, and the term is from 0.5 to 5 days.

EXAMPLES

The present invention will now be described in detail with reference to Examples.

Synthetic Example 1

Synthesis of Acrylic Polyol-1

Into a reactor having a thermometer, a stirrer, and a cooling pipe, 300 parts by mass of methyl ethyl ketone was put. The temperature inside the reactor was adjusted to be 80° C., a solution in which 340 parts by mass of methyl methacrylate, 150 parts by mass of n-butyl methacrylate, 10 parts by mass of 2-hydroxyethyl methacrylate, and 8.5 parts by mass of azobisisobutyronitrile had been dissolved in 160 parts by mass of methyl ethyl ketone was subsequently added thereto and stirred, and a reaction was performed for 16 hours to yield an acrylic polyol-1 (nonvolatile content: 52 mass %, viscosity: 2,000 mPa·s (23° C.), and number average molecular weight: 20,000).

Example 1

Into a four-necked flask having a thermometer, a stirrer, an inert gas inlet, and a reflux condenser, 15 parts by mass of polypropylene glycol (number average molecular weight: not more than 1,000, hereinafter abbreviated as "PPG1000"), 15 parts by mass of polypropylene glycol (number average molecular weight: not more than 2,000, hereinafter abbreviated as "PPG2000"), 10 parts by mass of crystalline PEs-1 (produced through a reaction of 1,6-hexanediol with 1,12-dodecanedicarboxylic acid, number average molecular weight: 3,500), 15 parts by mass of amorphous PEs-1 (produced through a reaction of a 6-mol propylene oxide adduct of bisphenol A with sebacic acid and isophthalic acid, number average molecular weight: 2,000), and 30 parts by mass of the acrylic polyol-1 were put, and the content was dehydrated under reduced pressure at 100° C. until the moisture content of the polyol mixture reached not more than 0.05 mass %.

Then, the temperature inside the reactor was decreased to 70° C., 15.5 parts by mass of 4,4'-diphenylmethane diisocyanate (MDI) was put thereinto, the temperature was increased to 100° C., and the reaction was performed for approximately 3 hours until the NCO group content reached a certain level, thereby producing a urethane prepolymer having an isocyanate group.

Example 2 to 8 and Comparative Examples 1 to 4

Except that the types and/or amounts of the polyols and the amount of the polyisocyanate were changed as shown in Tables 1 to 3, urethane prepolymers were produced as in Example 1.

[Evaluations of Coating Workability, Shape Retention after Application, and Open Time]

The urethane prepolymer produced in each of Examples and Comparative Examples was melted to be 120° C. and then applied with a dispenser needle having an internal diameter of 0.6 mm and preliminarily heated to 120° C. ("VALVE MASTER ME-5000VT" manufactured by Musashi engineering Co., Ltd.) at an ejection pressure of 0.3 MPa and a rate of 50 mm/sec for 10 seconds, and coating workability was evaluated as follows on the basis of the amount of the applied urethane prepolymer (g). The urethane prepolymer was applied onto a case (acrylic plate) under the above-mentioned conditions, and the height (mm) of the adhesive layer immediately after the application was observed to evaluate the shape retention after application thereof as follows. Furthermore, in the test of shape retention, the adhesive layer was touched with a finger by the minute from the moment of the application to confirm the degree of tackiness. The time (minute) until the tackiness on the surface of the adhesive layer disappeared was measured, and open time was evaluated as follows.

<Coating Workability>
A: 1.0 g or more
B: 0.6 g or more and less than 1.0 g
C: less than 0.6 g
<Shape Retention after Application>
A: 0.5 mm or more
B: 0.3 mm or more and less than 0.5 mm
C: less than 0.3 mm <Open Time>
A: 4 minutes or longer and shorter than 10 minutes
B: shorter than 4 minutes and 10 minutes or longer

[Evaluation of Flexibility]

The mechanical properties (100% modulus (MPa), stress at break (MPa), and elongation at break (%)) of the adhesive layer obtained in [Evaluations of Shape Retention after Application and Open Time] were measured in accordance with JIS K-7311, and the flexibility was then evaluated as follows on the basis of 100% modulus.
A: 5 MPa or lower
B: greater than 5 MPa and 7 MPa or lower
C: greater than 7 MPa

[Evaluation of Adhesion to Substrate]

The urethane prepolymer produced in each of Examples and Comparative Examples was melted to be 120° C. and then applied onto 200-μm-thick PET subjected to a corona treatment with a roll coater to a thickness of 100 μm, and a variety of substrates (ABS (acrylonitrile-butadiene-styrene) copolymer plate, PC (polycarbonate) plate, acrylic plate) were attached thereto. Each of the samples was left to stand in a constant-temperature bath at 23° C. and 65% RH for 3 days, and then the peeling strength thereof at 180° C. (N/inch) was measured in accordance with JIS K-7311.

[Evaluation of Drop Impact Resistance]

The urethane prepolymer produced in each of Examples and Comparative Examples was melted to be 120° C. and then applied onto an acrylic plate with a dispenser needle having an internal diameter of 0.6 mmΦ and preliminarily heated to 120° C. ("VALVE MASTER ME-5000VT" manufactured by Musashi engineering Co., Ltd.) in the form of bead to draw a 4-cm square having a thickness of 2 mm. Then, an ABS plate (5 cm×5 cm) was attached thereto, and the sample was subsequently left to stand in a constant-temperature bath at 23° C. and a relative humidity of 65% for 3 days.

Then, impact was applied five times to the sample from the attached-plate side with an impact core of DU PONT TYPE FALLING IMPACT TESTER at 23° C., a relative humidity of 50%, and a load of 300 g/30-cm height, and the drop impact resistance was evaluated on the basis of the presence or absence of peeling of the acrylic plate. A sample in which peeling had not been caused was evaluated as "A", and a sample in which peeling had been caused was evaluated as "B".

[Evaluation of Waterproof Properties]

The sample formed in [Evaluation of Drop Impact Resistance] was used and immersed into water (23° C., 0.5 hours), the presence or absence of the intrusion of the water into the immersed sample was subsequently observed in accordance with JIS IPX-7, and the waterproof properties were evaluated as follows.
A: No water intruded
B: Water intruded

TABLE 1

| | Example 1 | Example 2 | Example 3 | Example 4 |
|---|---|---|---|---|
| Polyol (A) | | | | |
| Polyether Polyol (A-1) | | | | |
| PPG1000 | 15 | 15 | 15 | 5 |
| PPG2000 | 15 | 15 | 15 | 5 |
| PTMG1000 | | | | |
| PTMG2000 | | | | |

TABLE 1-continued

|  | Example 1 | Example 2 | Example 3 | Example 4 |
|---|---|---|---|---|
| Crystalline Polyester Polyol (A-2) | | | | |
| Crystalline PEs-1 | 10 | 20 | 30 | 25 |
| Crystalline PEs-2 | | | | |
| Amorphous Polyester Polyol (A-3) | | | | |
| Amorphous PEs-1 | 15 | 15 | 15 | 20 |
| Acrylic Polyol (A-4) | | | | |
| Acrylic polyol-1 | 30 | 20 | 10 | 30 |
| Polyisocyanate (B) | | | | |
| MDI | 15.5 | 16 | 17 | 13 |
| Properties of Polyurethane Hot Melt | | | | |
| NCO % | 2.3 | 2.2 | 2.3 | 2.2 |
| Melt viscosity (mPa · s, 125° C.) | 4,300 | 4,000 | 3,800 | 4,400 |
| Coating Workability | A | A | A | A |
| Shape retention after Application | B | A | A | A |
| Open Time (minute) | 9 | 7 | 4 | 7 |
| Evaluation of Flexibility | A | A | B | B |
| Mechanical Strength | | | | |
| 100% modulus (MPa) | 4 | 5 | 7 | 7 |
| Stress at break (MPa) | 26 | 25 | 23 | 21 |
| Elongation at break (%) | 1,000 | 1,200 | 800 | 900 |
| Bond Strength to Substrate (N/inch) | | | | |
| ABS | 30 | 30 | 25 | 30 |
| PC | 35 | 30 | 25 | 30 |
| Acryl | 30 | 35 | 25 | 35 |
| Drop Impact Resistance | A | A | A | A |
| Waterproof Properties | A | A | A | A |

TABLE 2

|  | Example 5 | Example 6 | Example 7 | Example 8 |
|---|---|---|---|---|
| Polyol (A) | | | | |
| Polyether Polyol (A-1) | | | | |
| PPG1000 | 20 | 12.5 | 15 | |
| PPG2000 | 20 | 12.5 | 15 | |
| PTMG1000 | | | | 15 |
| PTMG2000 | | | | 15 |
| Crystalline Polyester Polyol (A-2) | | | | |
| Crystalline PEs-1 | 15 | 10 | 10 | 20 |
| Crystalline PEs-2 | | | 10 | |
| Amorphous Polyester Polyol (A-3) | | | | |
| Amorphous PEs-1 | 10 | 30 | 15 | 15 |
| Acrylic Polyol (A-4) | | | | |
| Acrylic polyol-1 | 20 | 20 | 20 | 20 |
| Polyisocyanate (B) | | | | |
| MDI | 17 | 16.5 | 15.4 | 16 |
| Properties of Polyurethane Hot Melt | | | | |
| NCO % | 2.2 | 2.3 | 2.3 | 2.2 |
| Melt viscosity (mPa · s, 125° C.) | 3,900 | 4,100 | 4,000 | 4,100 |
| Coating Workability | A | A | A | A |
| Shape retention after Application | B | B | A | B |
| Open Time (minute) | 9 | 8 | 7 | 9 |
| Evaluation of Flexibility | A | A | A | A |
| Mechanical Strength | | | | |
| 100% modulus (MPa) | 4 | 2 | 5 | 3 |
| Stress at break (MPa) | 22 | 24 | 25 | 23 |
| Elongation at break (%) | 1,000 | 1,000 | 1,200 | 1,000 |

TABLE 2-continued

|  | Example 5 | Example 6 | Example 7 | Example 8 |
|---|---|---|---|---|
| Bond Strength to Substrate (N/inch) | | | | |
| ABS | 30 | 40 | 40 | 30 |
| PC | 30 | 40 | 45 | 30 |
| Acryl | 30 | 35 | 30 | 30 |
| Drop Impact Resistance | A | A | A | A |
| Waterproof Properties | A | A | A | A |

TABLE 3

|  | Comparative Example 1 | Comparative Example 2 | Comparative Example 3 | Comparative Example 4 |
|---|---|---|---|---|
| Polyol (A) | | | | |
| Polyether Polyol (A-1) | | | | |
| PPG1000 | | 20 | 15 | 15 |
| PPG2000 | | 20 | 15 | 15 |
| PTMG1000 | | | | |
| PTMG2000 | | | | |
| Crystalline Polyester Polyol (A-2) | | | | |
| Crystalline PEs-1 | 30 | | 25 | 30 |
| Crystalline PEs-2 | | | | |
| Amorphous Polyester Polypol (A-3) | | | | |
| Amorphous PEs-1 | 25 | 20 | | 25 |
| Acrylic Polyol (A-4) | | | | |
| Acrylic polyol-1 | 30 | 30 | 30 | |
| Polyisocyanate (B) | | | | |
| MDI | 12.4 | 17.5 | 14.7 | 18 |
| Properties of Polyurethane Hot Melt | | | | |
| NCO % | 2.3 | 2.2 | 2.3 | 2.3 |
| Melt viscosity (mPa · s, 125° C.) | 5,600 | 4,000 | 4,100 | 3,000 |
| Coating Workability | B | A | A | A |
| Shape retention after Application | A | B | A | A |
| Open Time (minute) | 6 | 15 | 5 | 3 |
| Evaluation of Flexibility | C | A | C | B |
| Mechanical Strength | | | | |
| 100% modulus (MPa) | 8 | 3 | 10 | 6 |
| Stress at break (MPa) | 22 | 25 | 16 | 25 |
| Elongation at break (%) | 800 | 1,300 | 700 | 900 |
| Bond Strength to Substrate (N/inch) | | | | |
| ABS | 20 | 20 | 5 | 10 |
| PC | 20 | 20 | 10 | 10 |
| Acryl | 20 | 15 | 10 | 10 |
| Drop Impact Resistance | C | C | C | A |
| Waterproof Properties | C | C | C | C |

Abbreviations in Tables 1 to 3 are as follows:

"PTMG1000": polytetramethylene glycol, number average molecular weight of 1,000

"PTMG2000": polytetramethylene glycol, number average molecular weight of 2,000

"Crystalline PEs-2": produced through a reaction of 1,6-hexanediol with adipic acid, number average molecular weight of 2,000.

The product of each of Examples 1 to 8, which was the moisture-curable polyurethane hot-melt resin composition of the present invention, exhibited excellent results in the evaluations of waterproof properties, drop impact resistance, flexibility, adhesion to a variety of substrates, coating workability, shape retention after application, and open time.

In Comparative Example 1, the polyether polyol (A-1) was not used with the result that the waterproof properties, drop impact resistance, and flexibility were insufficient.

In Comparative Example 2, the crystalline polyester polyol (A-2) was not used with the result that the waterproof properties and drop impact resistance were insufficient.

In Comparative Example 3, the amorphous polyester polyol (A-3) was not used with the result that the waterproof properties, drop impact resistance, and flexibility were insufficient.

In Comparative Example 4, the acrylic polyol (A-4) was not used with the result that the waterproof properties were particularly insufficient.

The invention claimed is:

1. A moisture-curable polyurethane hot-melt resin composition comprising a urethane prepolymer having an isocyanate group, the urethane prepolymer being a reaction product of a polyol (A) and a polyisocyanate (B) only, wherein the polyol (A) contains a polypropylene glycol and/or polytetramethylene glycol (A-1), a crystalline polyester polyol (A-2), an amorphous polyester polyol (A-3), and an acrylic polyol (A-4), wherein:

the amorphous polyester polyol (A-3) is produced through a reaction of an alkylene oxide adduct of bisphenol A with a polybasic acid, and a glass transition temperature of the amorphous polyester polyol (A-3) is in a range of −70° C. to −10° C., wherein the polyester polyol (A-2) is 20 to 400 parts by mass, the amorphous polyester polyol (A-3) is 10 to 300 parts by mass and the acrylic polyol (A-4) is 20 to 400 parts by mass relative to 100 parts by mass of the propylene glycol and/or polytetramethylene glycol (A-1).

2. The moisture-curable polyurethane hot-melt resin composition according to claim 1, wherein the number average molecular weight of the acrylic polyol (A-4) is in the range of 5,000 to 50,000.

3. The moisture-curable polyurethane hot-melt resin composition according to claim 1, wherein the glass transition temperature of the acrylic polyol (A-4) is in the range of 30 to 120° C.

4. The moisture-curable polyurethane hot-melt resin composition according to claim 1, wherein the acrylic polyol (A-4) is produced through polymerization of a (meth)acrylic compound having a hydroxyl group with a (meth)alkyl acrylate.

5. The moisture-curable polyurethane hot-melt resin composition according to claim 1, wherein the amount of the acrylic polyol (A-4) is in the range of 40 to 280 parts by mass relative to 100 parts by mass of the polyether polyol (A-1).

6. The moisture-curable polyurethane hot-melt resin composition according to claim 1, wherein the amount of the amorphous polyester polyol (A-3) is in the range of 20 to 250 parts by mass relative to 100 parts by mass of the polyether polyol (A-1).

7. An adhesive comprising the moisture-curable polyurethane hot-melt resin composition according to claim 1.

8. An article comprising at least two materials attached to each other with the adhesive according to claim 7.

* * * * *